United States Patent [19]
Fritz

[11] 3,905,861
[45] Sept. 16, 1975

[54] POSTFORMING

[75] Inventor: Alton L. Fritz, Phoenix, Ariz.

[73] Assignee: Royal Industries, Inc., Pasadena, Calif.

[22] Filed: Aug. 13, 1973

[21] Appl. No.: 388,299

Related U.S. Application Data

[63] Continuation of Ser. No. 144,105, May 17, 1971, abandoned.

[52] U.S. Cl. .............. 156/499; 100/93 P; 156/475; 156/492; 156/580; 425/174.4
[51] Int. Cl.² ............ B30B 12/00; B30B 15/34; B32B 31/10
[58] Field of Search ......... 156/216, 492, 499, 475, 156/580, 583, 581; 100/92, 93 P, 93 RP, 93 S, 258 A; 425/174, 174.4, 406, 407; 74/230.01

[56] References Cited
UNITED STATES PATENTS

| | | | |
|---|---|---|---|
| 2,916,315 | 12/1959 | Hedrick | 74/230.01 |
| 3,290,202 | 12/1966 | Pratt | 156/583 |
| 3,463,080 | 8/1969 | Rodriguez et al. | 156/583 |
| 3,582,430 | 6/1971 | Benigno | 156/499 |
| 3,616,076 | 10/1971 | Gepkens | 156/216 |
| 3,668,033 | 6/1972 | Evans | 156/499 |
| 3,682,010 | 8/1972 | Brooks et al. | 74/230.01 |
| 3,690,995 | 9/1972 | Loy | 156/499 |

*Primary Examiner*—Charles E. Van Horn
*Assistant Examiner*—Basil J. Lewis
*Attorney, Agent, or Firm*—Lynn G. Foster

[57] ABSTRACT

A postforming apparatus for making a configurated, laminated workpiece, the apparatus comprised of a forming press having a lower, stationary platen and an upper reciprocable platen which cooperate to apply pressure to selected portions of the laminated workpiece. Movable edge members are hingedly attached to the upper platen and are adapted to be mechanically rotated to bend heat-softened veneer into a generally contiguous configuration with a contoured base component. A latch mechanism may be used to forcibly rotate each edge member and complete the bending of the veneer.

A motor-power drive assembly mechanically displaces a longitudinally-extending heater between a location remote from the workpiece to one or the other of two positions adjacent either edge of the veneer to effectively soften the edge of the veneer prior to postforming or bending thereof.

6 Claims, 18 Drawing Figures

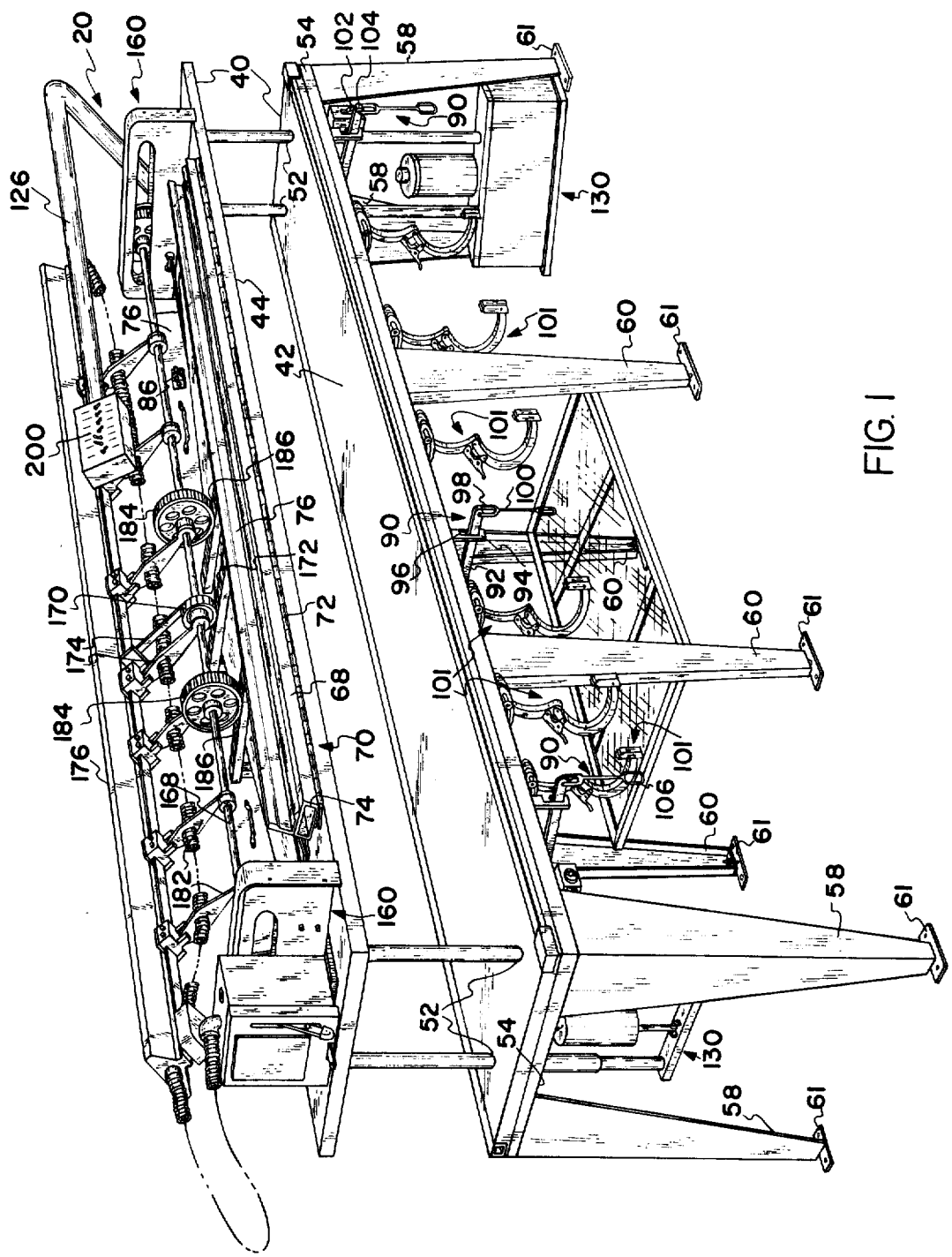
FIG. 1
INVENTOR.
ALTON L. FRITZ
ATTORNEY

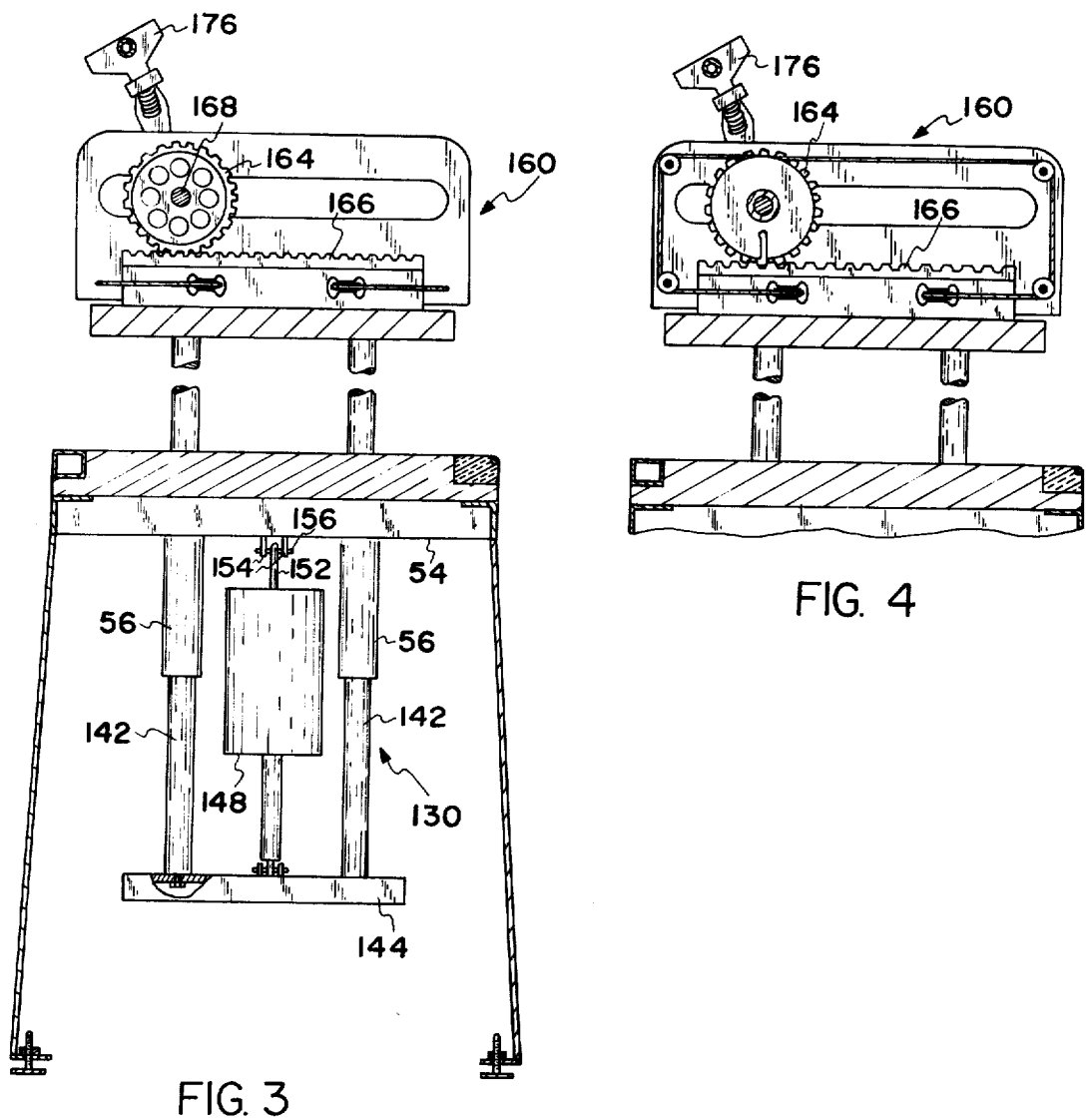
FIG. 3
FIG. 4
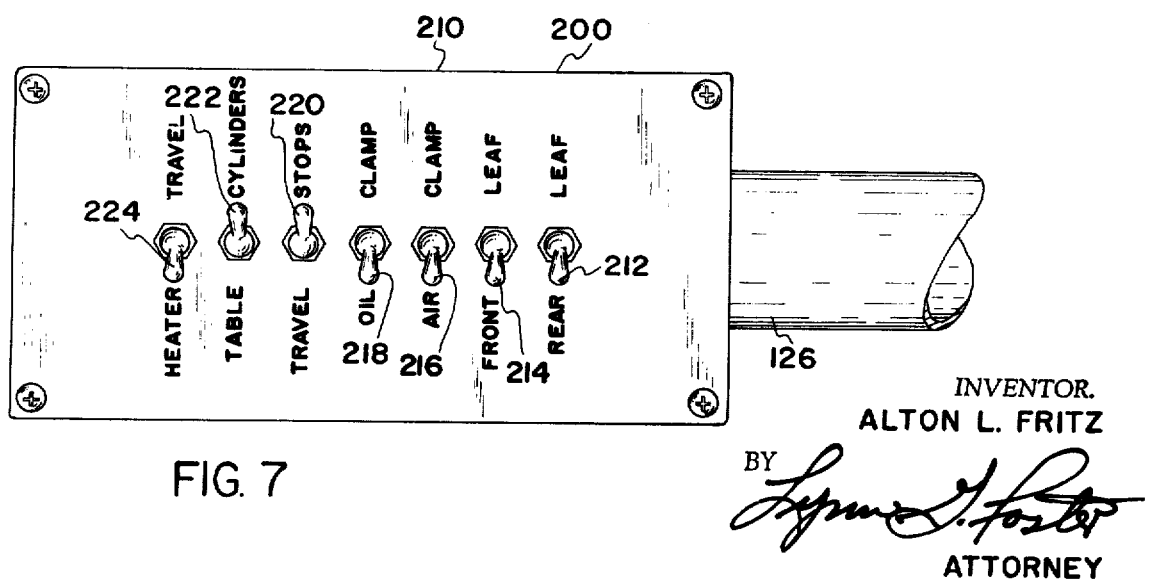
FIG. 7
INVENTOR.
ALTON L. FRITZ
BY
ATTORNEY

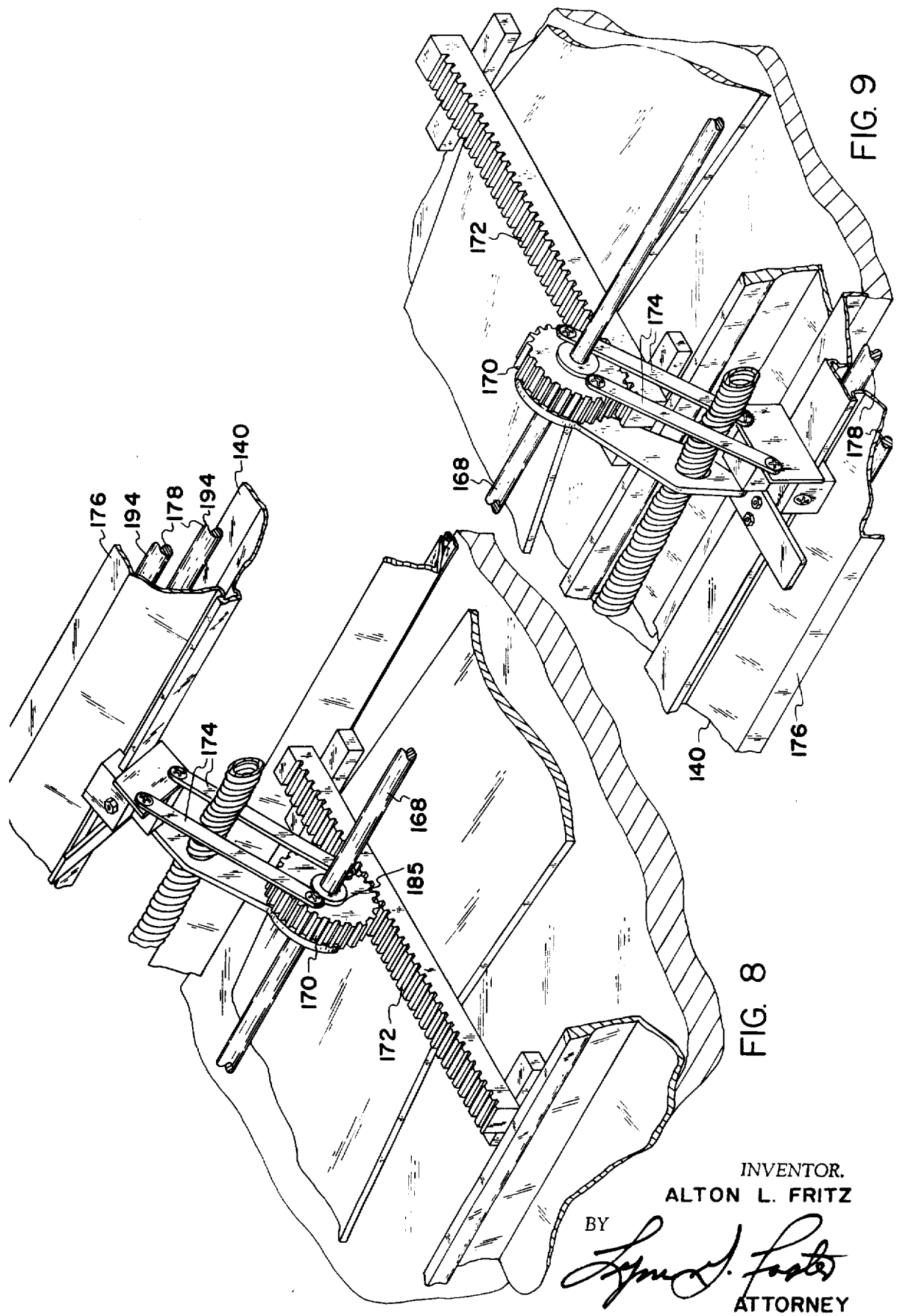

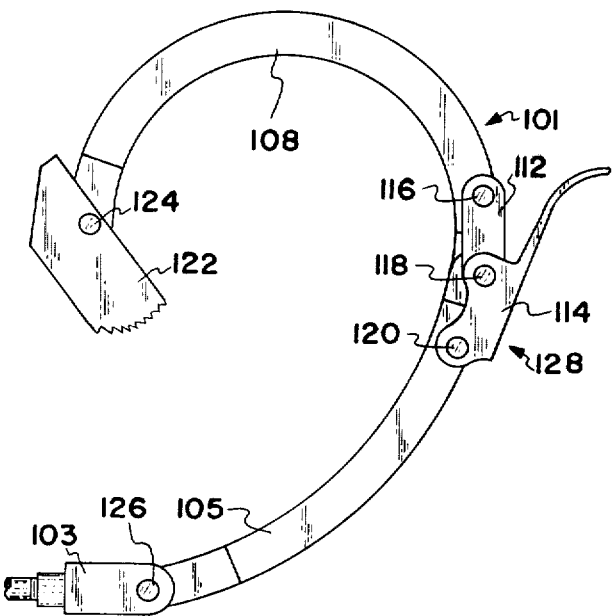
FIG. 10
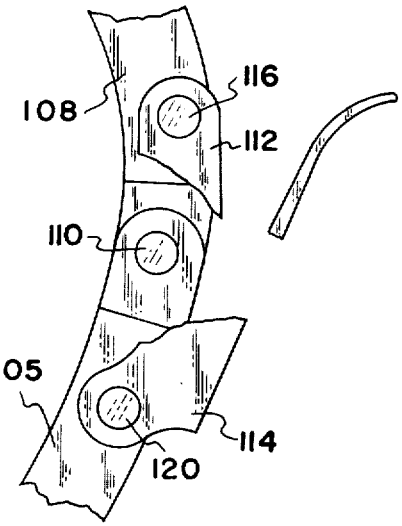
FIG. 12
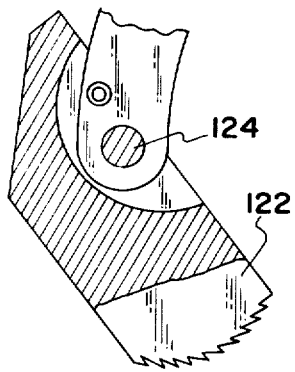
FIG. 11
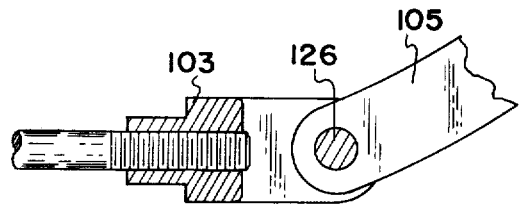
FIG. 15
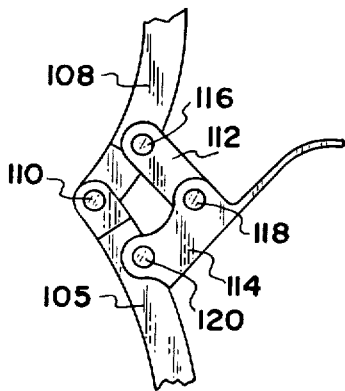
FIG. 13
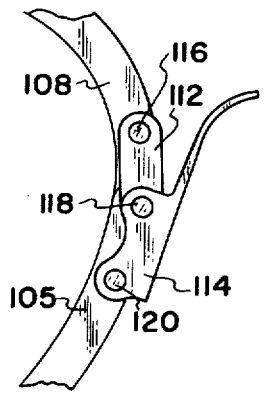
FIG. 14

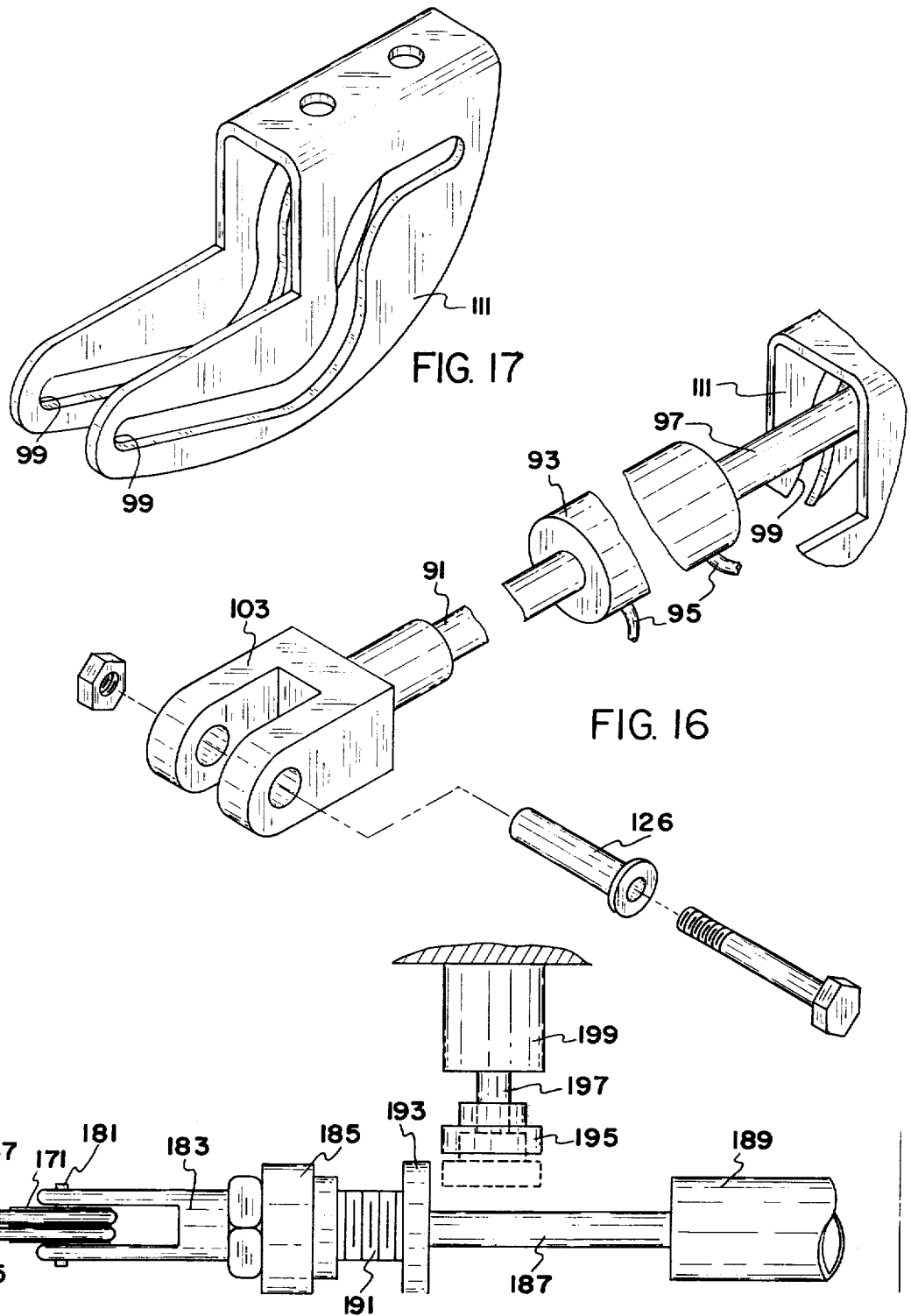

POSTFORMING

This application is a continuation of my copending U.S. Pat. application Ser. No. 144,105, filed May 17, 1971, now abandoned.

BACKGROUND

1. Field of the Invention

The present invention generally relates to the making of a laminated workpiece and more particularly postforming, i.e. a unique method of and a novel apparatus for making a laminated workpiece comprising a base, such as wood, and an exposed covering of postformable plastic veneer bonded to the base, the plastic being rigid at room temperature but pliable at elevated temperatures. The fabricated workpiece may be a preformed contoured countertop, such as those used in residential kitchens, and the plastic covering may be of decorative "Formica" or the like, though this invention is not limited to such a configuration or to use of such covering material.

2. Prior Art

Previously, the manufacture of laminates having a high pressure laminate plastic veneer covering has normally necessitated utilization of either comparatively massive, multiple station, automated pressure and heat-applying equipment or manually operated units. Disadvantageously, such automated equipment is very costly to initially purchase and to thereafter maintain, occupies a substantial area of the plant floor space, and lacks versatility of use. Commercial use of such equipment is fundamentally restricted to the automated manufacture of laminated patterns of standardized configuration where high production rates are essential. Use of such costly and bulky equipment for custom manufacturing or for varied types and quantities of production, where possible, is awkward and not economically feasible, especially with respect to relatively small business concerns engaged in specialized laminating work or operating on an irregular, limited production basis. To the contrary, manually operated postforming equipment does not accommodate the continuously rapid production of such laminated workpieces required in some shops.

BRIEF SUMMARY AND OBJECTS OF THE INVENTION

With the foregoing in mind, it is a primary object of the present invention to provide improved laminating method and apparatus for postforming use.

An additional important object of the present invention is to provide a novel automated postforming apparatus which is versatile and compact, comparatively inexpensive to purchase and maintain and convenient to operate.

Another principal object of the present invention is the provision of a single station postforming apparatus wherein a heat-applying portion thereof is structurally separate from the pressure applying portion and can be readily power displaced to either of two oppositely disposed effective positions during use and to a remote position during nonuse.

A further significant object is the provision of a novel method of postforming plastic veneer to a base structure which method uniquely accommodates heat-softening of select portions of the plastic veneer by the use of concentrated heat from a power displaced heat-applying portion to enable permanent bonding and exact shape conformity between the base and the plastic veneer without cracking or creation of heat flaws.

Another object of significance is the provision of a novel system for controlling the power displacement of a heating element comprising part of a postforming apparatus.

These and other objects and features of this invention will become more fully apparent from the following description and appended claims taken in conjunction with the accompanying drawings wherein:

BRIEF DESCRIPTION OF THE DRAWINGS

FIG. 1 is a perspective view of one presently preferred laminating apparatus according to the present invention;

FIG. 3 is a cross-sectional view in elevation taken along line 3—3 of FIG. 2 with parts removed for clarity;

FIG. 4 is a cross-sectional view in elevation taken along line 4—4 of FIG. 2 with parts removed for clarity;

FIG. 6 is an end elevation view taken along line 6—6 of FIG. 1 showing the alternate positions of the control box support arm;

FIG. 7 is an enlarged view taken along line 7—7 of FIG. 6 illustrating the face of the control box;

FIG. 8 is a fragmentary perspective of part of the upper platen showing, in relation to the main heater rotating gear, part of the heater assembly in a remote position while not in use;

FIG. 9 is a fragmentary perspective similar to FIG. 8 except the main heater rotating gear and the heater assembly are shown in an operative position during use;

FIG. 10 is a side elevation view of a clamp which is utilized in forming a core in a workpiece;

FIG. 11 is an enlarged fragmentary view, partially broken away for clarity, illustrating the manner in which the distal end of the clamp of FIG. 10 is secured to the next adjacent part thereof;

FIG. 12 is an enlarged side elevation of the central joint in the clamp in FIG. 10 with parts broken away for the purpose of clarity;

FIGS. 13 and 14 illustrate the central joint in the clamp of FIG. 10 in pivoted and locked dispositions, respectively;

FIG. 15 is an enlarged view, partly in section of the clevice disposed at the proximal end of the clamp of FIG. 10;

FIG. 16 is a perspective representation of the proximal clevice of FIG. 15 in conjunction with a driving piston and control cam bracket;

FIG. 17 is an enlarged perspective representation of the control cam bracket of FIG. 16; and FIG. 18 is a fragmentary view of drive cylinder structure and stop structure of the cable and gear drive assembly schematically shown in FIG. 5.

DETAILED DESCRIPTION OF THE ILLUSTRATED EMBODIMENT

The Apparatus

Figure 2:
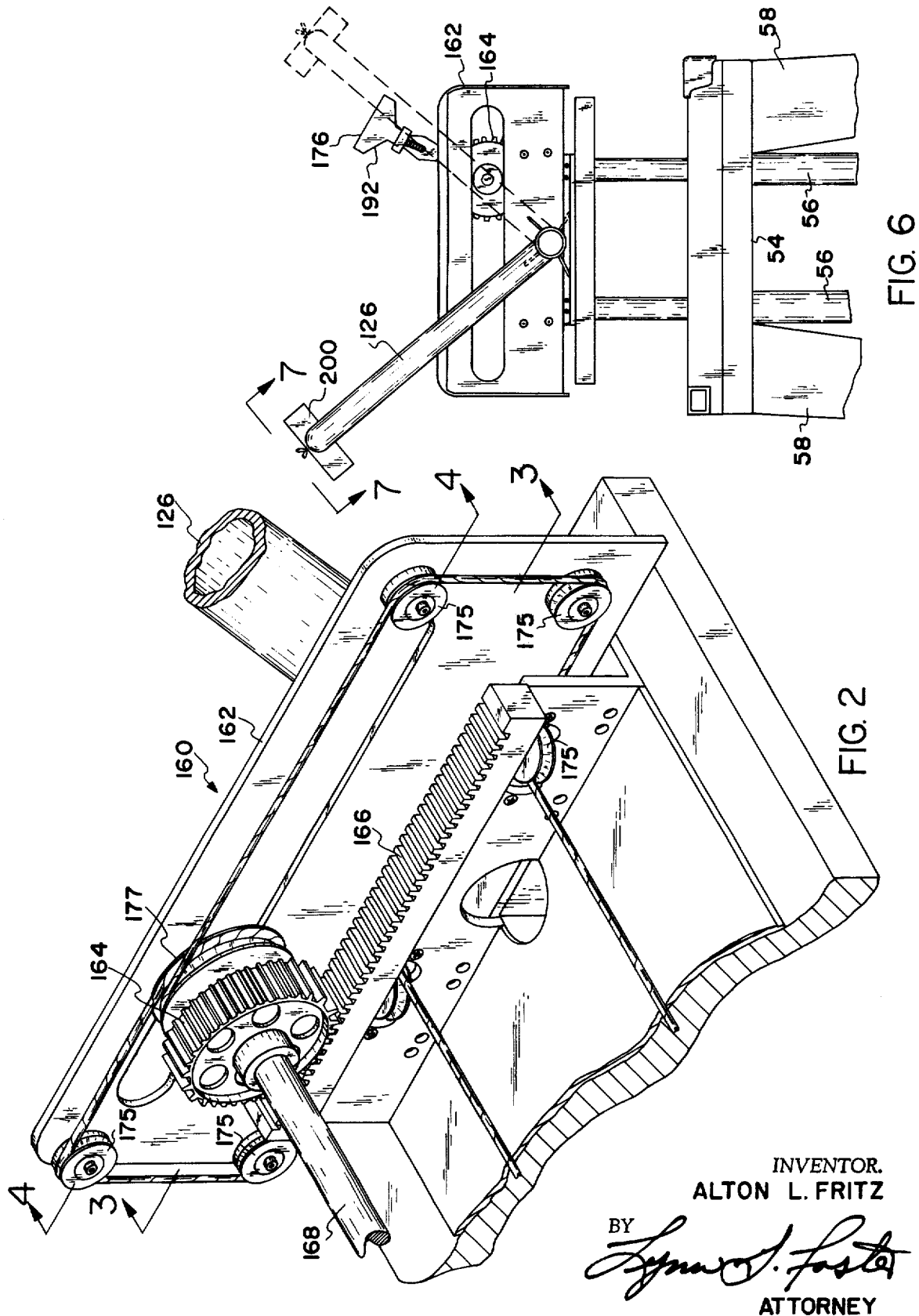
FIG. 2 is an enlarged fragmentary perspective representation of one end of the upper reciprocating platen showing part of a cable and gear drive system used to rotate a heater assembly.

Reference is now made in general to FIGS. 1–18 of the drawings which illustrate the presently preferred postforming apparatus of this invention, generally designated 20. The laminating apparatus 20 is extremely versatile and compact, and accommodates single station fabrication of a laminated workpiece comprising a base and a plastic veneer covering. The apparatus 20 comprises a pressure applying mechanism and a heat applying mechanism each of which is structurally separate from each other.

The Press

FIGS. 1, 2, 3, and 7 show a forming press, generally designated 40, which operates to apply pressure to the workpiece to restrain the same against displacement as the edges of the veneer are appropriately configurated and bonded to the base. The press 40 comprises a lower stationary platen 42 and an upper reciprocable platen 44, which is lowered or elevated by a hydraulically actuated power mechanism, generally designated 130. These parallel planar platens, upper 44 and lower 42, are composed of wood, metal, or the like.

As best visualized in FIG. 1, the lower platen 42 is fabricated to include four post-receiving apertures 52, two being alignedly disposed adjacent each end of the apparatus 20. The lower stationary platen 42 also comprises angle braces 54 disposed along the full periphery at the bottom of the lower platen 42, being rigidly attached thereto by bolts or other suitable means.

Four guide sleeves 56 are respectively and suitably secured to the lower platen, such as at the inwardly extending leg of the angle brace 54, by welding or the like, so as to project downwardly in essentially concentric relation with the adjacent post-receiving apertures 52.

The corner legs 58, and the support legs 60, are constructed of formed metal, and attached to the bottom edge of the angle bracer 54, by welding or the like.

Each leg 58 and 60 is attached to a bottom plate 61 which is in contact with the floor.

The upper platen 44 is also provided with a movable edge member, generally designated 68, at each side edge of the platen 44. The edge members are best seen in FIG. 1. Each movable edge member 68 is hinge mounted at 70 by a suitable hinge 72 to the upper surface of the strip 50 of the upper platen 44 near the edge thereof. Carried at the opposite leg of each hinge 72 is an elongated spacer block 74, of suitable material. A longitudinally extending angularly shaped member 76 is integrally attached to the upper surface of the spacer block 74 in a suitable manner, as seen in FIG. 1.

The upwardly extending leg of the angle 76, when viewed as in FIG. 1, integrally carries four transverse latch plates 86 integrally joined to the upwardly extending leg of angle 76. Each latch plate 86 operates in conjunction with a latch mechanism, generally designated 90.

The latch mechanism 90 is a backsplash clamp and comprises oppositely transversely extending arms 92 which are supported individually by an anchor bracket 94 slotted at 96 the arm 92 passing through the slot 96. The anchor bracket 94 is integrally joined to the depending leg of the angle brace 54, as for example by welding.

A clevis 98 of an adjustable turnbuckle 100 is pivotally pin joined at 102 to the distal end 104 of each arm 92. Thus, the turnbuckle is freely swingable about the pin 102. The end free of the turnbuckle comprises an elongated eye loop 106 suitably shaped to easily fit over the latch plate 86. The backsplash clamp 90 is actuated by a hydraulic power mechanism (not shown).

Also used to bring pressure to bare on the hinged leaf 68, is a "C" clamp assembly generally designated 101, and best illustrated in FIGS. 10 and 11. The C clamp assembly 101 comprises a clevis 103 which is connected to the upper arm 105 of the clamp assembly 101. The upper arm 105 is joined to the lower arm 108 by a rivet 110, also the upper arm 105 and 108 by a rivet 110, also the upper arm 105 and the lower arm 108 are connected to a locking mechanism, generally designated 128, which comprises a hinge plate 112 and a lever 114. The hinge plate 112 is joined to the lower arm 108 and to the lever 114 by rivets 116 and 118 respectively. The lever 114 is attached to the upper arm 105 by rivet 120. Also joined to the lower arm 108 is a foot clamp 122 by pin 124.

The C clamp assembly 101 hangs free while not in use, as shown in FIG. 1, and is pivoted about pin 126, which connects the clevis 103 to the upper arm 105, where it brings pressure to bear on the hinged leaf member 68. FIG. 13 shows the locking mechanism 128 as open while FIG. 14 shows the locked position of locking mechanism 128. The open and locked positions allow the C clamp assembly 101 to first be placed into the desired position while in the open position, and then locked so as to allow no movement between the upper arm 105 and the lower arm 108.

To actuate the C clamp assembly 101, as best seen in FIG. 16, clevis 103 is mounted on one arm 91 of a double-acting pneumatic cylinder 93 which is operated by pressurized air from a suitable source, not shown, through hoses 95. The other arm 97 of pneumatic cylinder 93 is secured by a suitable pin or the like, not shown, which rides in cam slots 99 of a generally U-shaped bracket 111 secured to the underside of the lower platen 42. When air is applied, through hoses 95, the arms 91 and 97 are retracted into cylinder 93 to cause C clamp assembly 101 to firmly lock the workpiece in place.

The hydralic power source of the backsplash clamp 90, and the pneumatic power source of the C clamp assembly 101 are actuated by electric switches 218 and 216 respectively which are located on the control box 200.

It is to be noted that the upper platen 44 is reciprocated between an open position generally shown in FIGS. 1, 2, and 3 and closed position, not shown. This reciprocating movement, which keeps the upper platen 44 essentially parallel to a lower platen 42, is accomplished by means of the hydraulically actuated power mechanism shown in FIGS. 1 and 3, which is generally designated 130.

The power mechanism 130, one being located at each end of the apparatus, comprises a pair of posts 142 disposed in aligned relation at each end of the apparatus, comprises a pair of posts 142 disposed in aligned relation at each end of the laminating apparatus 20. Each post 142 is integrally secured by suitable means to a bridge member 144, which is channel-shaped in cross section. Each post 142 upwardly extends through one guide sleeve 56 and the concentric aperture 52 in the lower platen 42 and is integrally secured to the upper platen 44, as for example by a threaded attachment. Each post 142 passes through the adjacent guide sleeve 56 and aperture 52 in spaced relation so that the reciprocal movement of the post does not bind against the sleeve or the lower platen 42. By reason of this reciprocating motion, the operator of the laminating apparatus 20 has ready access to the press from either side thereof.

The upper end of the cylinder 148 includes a lug 152 which is pin joined at 156 to the angle brace 54 through a pair of spaced anchor lugs 154. While other types of connections may be used to join the two-way cylinder 148 to the lower platen 42 and to the bridge 144, the described pin joints offer the advantage of substantially eliminating any binding which might otherwise occur.

The Heater Assembly

Figure 5:
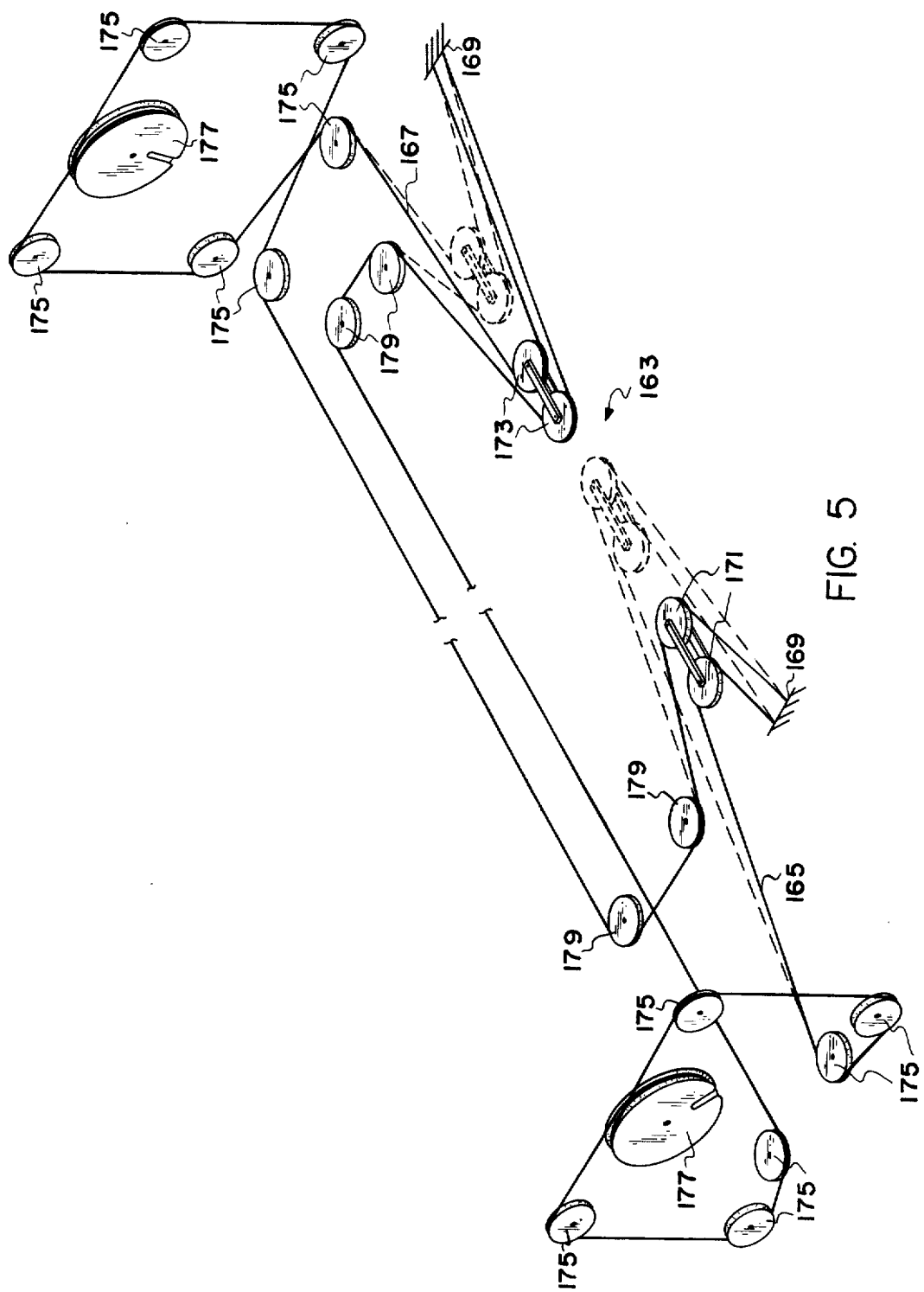
FIG. 5 is a perspective view of the cable drive system which is used to displace a heater between operational and remote positions.

The support frame of the laminating apparatus 20, includes at each end of the apparatus a rectangular support, generally designated 160. Each rectangular support 160 comprises integral members including a rectangular back plate 162 which holds thereon a system of pulleys, generally designated 163 in FIG. 5. The pulleys are instrumental in rotating gears 164, back and forth across a gear track 166. As seen in FIG. 5, cable 165 and 167 have their opposite ends anchored by suitable means, not shown, to the upper surface of upper platen 44, as seen at 169. The cables 165 and 167 are passed about actuator pulleys 171 and 173 and about a series of intermediate pulleys 175, which are carried by the rectangular supports 160 as seen in FIG. 2, and pass about and are secured to drive pulleys 177 which serve to rotate gear shaft 168. Intermediate pulleys 179 are mounted on any convenient structure between the rectangular supports 160, such as the underside of gear tracks 84. As best seen in FIG. 18, the actuator pulleys 171 are secured, as by pin 181, in a clevis 183 which is mounted by coupling 185 to one arm 187 of a double-acting hydraulic piston 189. Actuator pulleys 173 are mounted identically to an arm not shown, at the opposite end of piston 189. Coupling 185 is provided with a threaded portion 191 on which is secured a radially projecting nut 193 and a stop 195 is carried by arm 197 of hydrualic piston 199. Arm 197 of piston 199 is movable perpendicular to the axis of arm 187 of piston 189 and normally maintains stop 195 in the full line position, but is operable to lower stop 195 into the dotted line position to engage nut 193 and block movement of arm 187 and actuator pulleys 171. Referring to FIG. 5, it will be seen that when piston 189 moves actuator pulleys 171 and 173 from the full line position to the dotted line position, the cables 165 and 167 will serve to rotate drive pulleys 177 clockwise, thereby rotating gear shaft 168 and causing gears 114, 170 and 184 to carry heater assembly 176 toward the front of the machine. Conversely, when piston 189 moves actuator pulleys 171 and 173 from the dotted line position to the full line position, the heater assembly 176 will be moved toward the rear of the machine. Stop 195 is actuable to halt the movement of actuator pulley 171 to maintain the heater assembly 176 in the "at rest" position. Connected to the gear 164 is a gear shaft 168 which extends between the two back plates 162 into the center of the gears 164. Bisecting the gear shaft 168 is another rotating gear 170 which rotates along gear track 172, and has braces 174, which, when the gear 170 is centered in track 172, extend upwardly and hold the heating apparatus 176 in a vertical position. The heating apparatus 176 is also supported by braces 182 which are spaced at certain defined intervals. Also gears 184 which run along tracks 186 and are at spaced intervals from the center gear 170 act as a support for heating apparatus 176 by more evenly distributing the weight along the gear shaft 168. As best seen in FIGS. 1, 8, and 9, gear 170 is of smaller diameter than gears 164 and 184 and is mounted on shaft 168 by means of a suitable bearing 185. Thus, as the pulley system 163 causes gears 164 to move along the tracks 166, carrying shaft 168, gear 170 will be caused to rotate at a faster rate than gears 164 and this motion will be transmitted through braces 174 to rotate the heater assembly 176. When the gear 170 is centered in the track 172 the heating apparatus 176 is maintained with the heating elements 178 pointed directly upward (not shown). As the gear 170 reaches the end of the track 172 the rotating braces 180 pivot the heating element 178 into a position that will supply the laminate with the most concentrated heat, (FIG. 9). The standard position of the heating apparatus 176 while not in use is with the gear 170 rotated approximately two-thirds from the front of the track 172, with the braces 174 and 180 tilted slightly backwards, as best seen in FIGS. 1 and 8. Thus, the heating apparatus 176 does not hinder the operator while not in use.

The heater assembly 176 is structurally independent or separate from the pressure means 40, (though additional heating means could be associated with either the upper 44 or the lower 42 platens or both to aid in forming and bending). The heating apparatus 176 accommodates precise contoured bonding of the edges of the plastic veneer to the adjacent base portion of the workpiece, especially where the base is irregularly contoured at one or both edges.

The heating apparatus 176 is conventional and comprises one or more heating elements 178 (FIGS. 8–9), a reflective shield 140, and end plates 192 (FIG. 1). The heating element 178 is illustrated as being electric in the drawings, the electric conduit 194 being adapted to receive a 220 volt potential.

The process of placing the heating apparatus 176 is carried out mechanically. When the electrical switch 224 is activated it actuates a hydraulic power source (not shown) which is connected to the pulley system 164 which rotates the heating apparatus 176 as previously described. By way of example only, the heat source 178 may be radiant, one such suitable heater being the "Chromalax" Radiant Heater, Catalog No. RADD 764X9A manufactured by Edwin L. Wizgal Company of Pittsburgh, Pa.

Of course, if desired, a suitable conduction heater could be used in preference to a radiant heater. Also, a suitable conventional temperature control mechanism (not shown) can be provided to regulate the temperature of the heat radiating from the heating element 178.

The Control Box and Movable Arm

The control box, generally designated 200, comprises a box 210 with switches 212–224 (FIG. 4). Switches 212 and 214 rotate the rear and front leafs 68, respectively, through 180° into the desired position. Switch 216 actuates a pneumatic power source (not shown) which tightens the C clamp assembly 101. Switch 218 actuates a hydraulic power source which tightens a backsplash clamp, not shown. Switch 220 utilizes the travel stops (not shown). Switch 222 raises and lowers the upper platen 44. Switch 224 rotates the heating apparatus 176.

The movable arm 126 is comprised of pipe which extends from a point on the end of the laminating apparatus 20 to a suitable position in front of the apparatus 20. The arm 126 has a pivoting movement which allows it to be rotated from a suitable position in front of the apparatus 20 to an opposite position in back of the apparatus (FIG. 6).

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description and all changes which come within the meaning and range of equivalency of the claims are therefore to be embraced therein.

I claim:

1. A postforming apparatus comprising:
a reciprocable press comprising lower press means, upper press means and power means for reciprocating the press between open and closed positions, the closed position clamping a workpiece between the upper and lower press means said workpiece comprising a base and a postformable plastic veneer;
a heater assembly mounted above the upper press means comprising: (a) a longitudinally extending structure comprising elongated heat-producing means and reflecting shield means located to one side of and carrying the heat-producing means, (b) support shaft means comprising an axis of rotation for said shield means and heat-producing means, (c) power drive means for causing both rotational and translational motion of said shaft means, (d) a plurality of supports non-rotatably joined to the support shaft means and rotatably and pivotally joined to the shield each forming a radius between the shaft means and the shield means, (e) at least one shield-orientation means rotatably and pivotally joined to the shield means and rotatably joined to the shaft means, respectively, whereby upon actuation the power drive means rotates and translates the shaft means and the shaft means in turn rotates the supports, the shield means and the heat-producing means as a unit about the axis of the shaft means between an elevated disposition above the upper press means to a disposition adjacent a side of the upper press means, said power drive means also causing the shield orientation means to selectively rotate the shield means and the heat-producing means pivotally at said joints with said plurality of supports and shield orientation means as the side position is approached causing a reorientation of the shield from generally below to directly above the heat-producing means for heat softening the edge of the plastic postformable veneer of the workpiece thereby accomodating permanent contoured postforming lamination between the plastic veneer edge and the adjacent base.

2. The apparatus of claim 1 wherein said power drive means comprises spaced meshed toothed rack and gear sets, each said gear being carried by the shaft means, and power drive means further comprising means connected to the shaft means for turning the shaft means and thereby causing each gear to walk along the associated rack and to rotate said displace the shield means and the heat-producing means into said edge position.

3. The apparatus of claim 2 wherein the turning means comprise a cable wrapped around the shaft means, pulley means through which the cable passes and means for pulling the cable from either direction.

4. The apparatus of claim 3 wherein the cable pulling means comprises a two way cylinder connected by the pulley means to the cable and selectively operable stop means controling the displacement of the two way cylinder.

5. The apparatus of claim 2 wherein at least one rack and gear set comprises a gear smaller in diameter than the other gears and spaced arms respectively fixedly attached to the side of the small diameter gear and to the shield means to cause said displacement of the shield means in respect to the plurality of supports.

6. The apparatus of claim 1 further comprising a control arm mounted to the upper press means and manually pivotable between elevated positions on opposite sides of the upper press means.

* * * * *